(12) United States Patent
Frey et al.

(10) Patent No.: US 6,629,108 B2
(45) Date of Patent: Sep. 30, 2003

(54) METHOD FOR INSURING DATA INTEGRITY FOR MIRRORED INDEPENDENTLY ACCESSIBLE MEMORY DEVICES

(75) Inventors: Amy L. Frey, Boise, ID (US); Shane D. Pielli, Boise, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 320 days.

(21) Appl. No.: 09/802,346

(22) Filed: Mar. 9, 2001

(65) Prior Publication Data

US 2002/0129040 A1 Sep. 12, 2002

(51) Int. Cl.[7] .................. G06F 17/30; G06F 12/00
(52) U.S. Cl. ............... 707/202; 707/203; 707/204; 707/205
(58) Field of Search ................ 707/202, 203, 707/204, 205

(56) References Cited

U.S. PATENT DOCUMENTS

| | | | | |
|---|---|---|---|---|
| 4,467,411 A | * | 8/1984 | Fry et al. ............... 364/200 |
| 5,138,710 A | * | 8/1992 | Kruesi et al. ........... 395/575 |
| 5,257,368 A | * | 10/1993 | Benson et al. ........... 707/202 |
| 5,278,982 A | * | 1/1994 | Daniels et al. ........... 707/204 |
| 5,418,940 A | * | 5/1995 | Mohan ................... 395/575 |
| 5,642,417 A | * | 6/1997 | Stringer .................... 380/4 |
| 5,724,578 A | * | 3/1998 | Morinaga et al. ........ 707/100 |
| 5,745,674 A | * | 4/1998 | Lupton et al. ........ 395/182.18 |
| 5,778,442 A | * | 7/1998 | Ezzat et al. .............. 711/159 |
| 5,838,944 A | * | 11/1998 | Kipp et al. .............. 395/394 |
| 6,078,930 A | * | 6/2000 | Lee et al. ............... 707/202 |
| 6,366,988 B1 | * | 4/2002 | Skiba et al. ............. 711/165 |
| 6,460,055 B1 | * | 10/2002 | Midgley et al. .......... 707/204 |
| 6,526,417 B1 | * | 2/2003 | Perry .................... 707/202 |
| 2001/0034737 A1 | * | 10/2001 | Cane et al. .............. 707/204 |

* cited by examiner

Primary Examiner—Frantz Coby

(57) ABSTRACT

The present invention relates to a system and method for preserving and identifying recency information for data stored in multiple mirrored memory locations in a redundant data storage mechanism. The inventive approach builds upon the benefits presented by redundant storage by appending an indication of storage recency to stored data, thereby enabling a future read operation to identify a degree of recency for data stored in each of a plurality of mirrored sites. The read operation will generally return only the most recently stored data found among the plurality of mirrored locations.

20 Claims, 4 Drawing Sheets

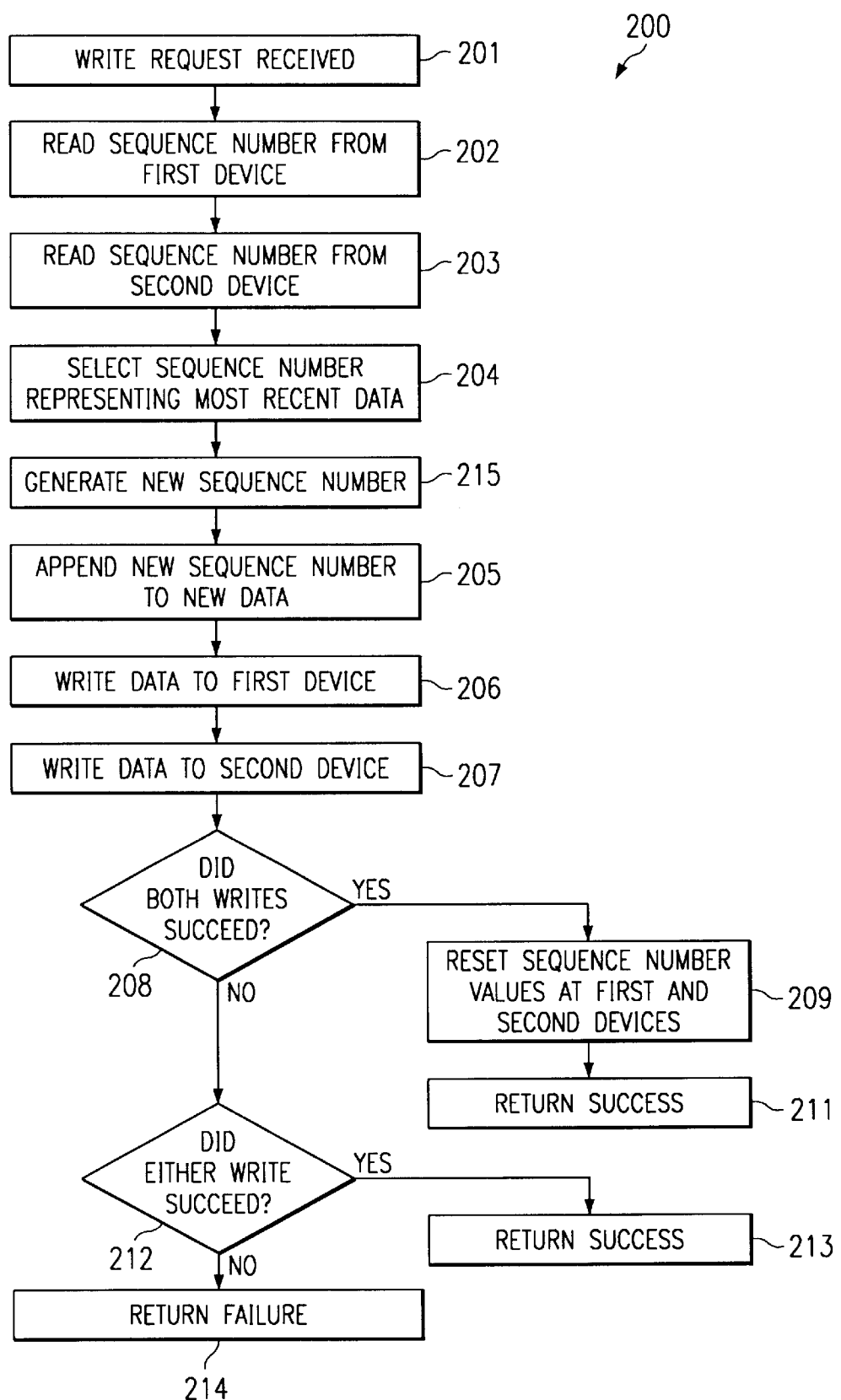

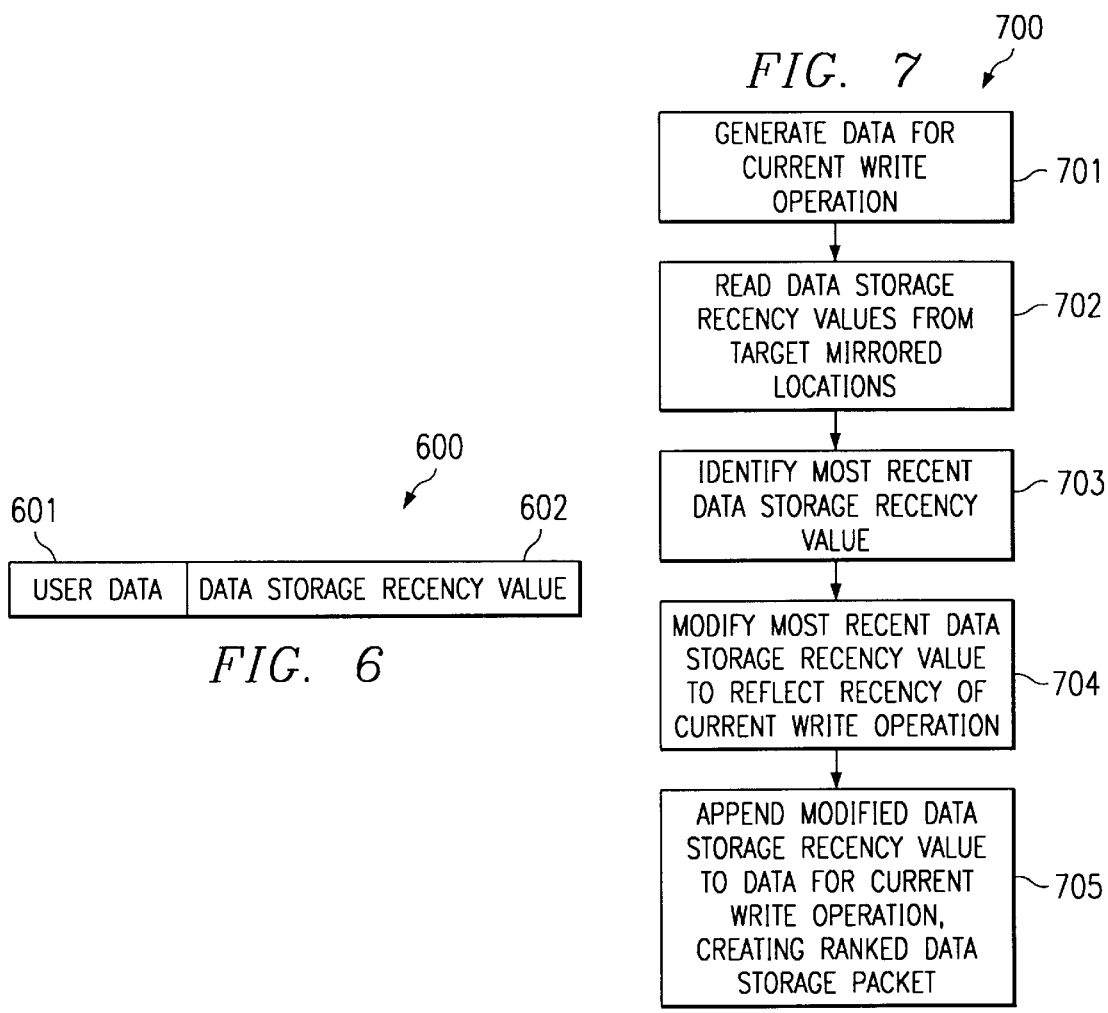
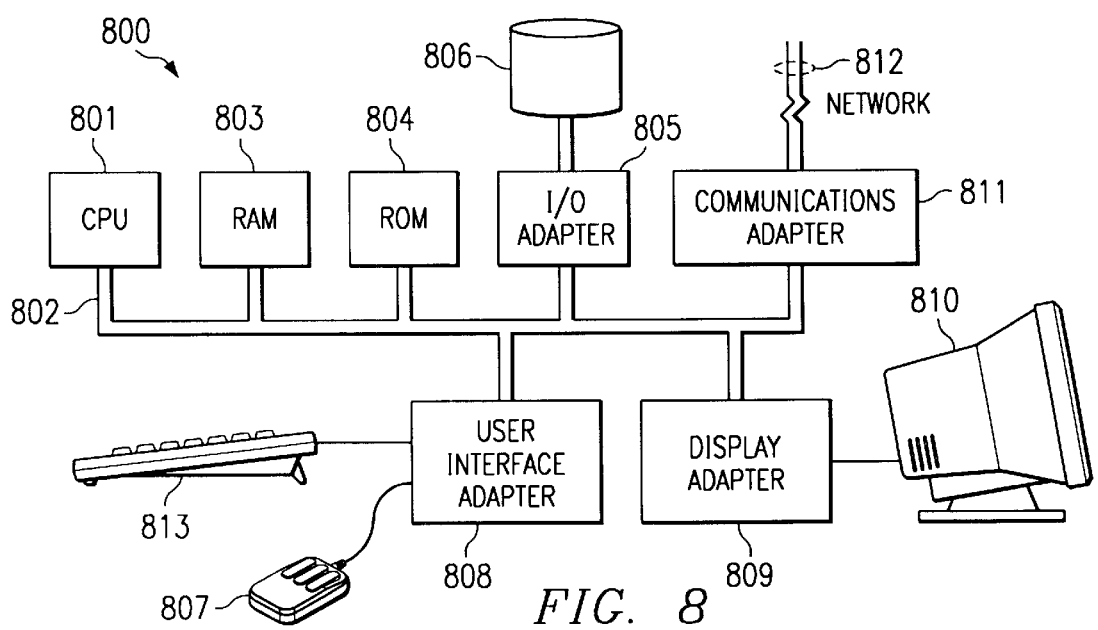

METHOD FOR INSURING DATA INTEGRITY FOR MIRRORED INDEPENDENTLY ACCESSIBLE MEMORY DEVICES

TECHNICAL FIELD

This invention relates in general to redundant memory storage systems and in particular to provision of data reliability information in redundant memory storage systems.

BACKGROUND

In the field of computer memory storage, the loss or corruption of data stored in a single location is a matter of concern. One approach to dealing with this problem is to store the same data in two separate locations so that in the event that a first location is unavailable, or that the data in the first location has been lost or corrupted, the stored data may be read from the second, or mirrored, location. In this way, the originally stored data may be recovered even though one storage location was unable to provide the stored data.

A problem which may arise employing the above solution is that during the course of operation of a computer system there may be occasions during which data is written to only one of the mirrored locations. This may arise where one of the storage locations is unavailable for a write operation for some reason. In this situation, one of the mirrored locations will have more recent data than the other.

Subsequently, when the computer system attempts to read data from the mirrored memory locations, the data stored in the two locations may differ. Moreover, where such a disparity in the data values stored in the mirrored locations exists, it is generally not possible to determine which of the two locations has the most recent and most valid data. The system accessing the data may then run the risk of acquiring and using obsolete data without knowing it.

Accordingly, it is a problem in the art that the use of redundant memory locations may lead to two mirrored memory locations having different data stored in them.

It is a further problem in the art that where mirrored memory locations contain different data, it is generally not possible to determine which of the two memory locations was most recently written to.

SUMMARY OF THE INVENTION

The present invention is directed to a system and method which flags write operations to two or more mirrored memory locations with identifying data to indicate a degree of recentness or recency of the write operations to each of the various mirrored memory locations within an overall data storage system. The identifying data may be appended to the data written as part of the write operation and stored in the various mirrored memory locations for subsequent evaluation by a read operation. The identifying data may include sequential numbering data to conveniently and directly indicate a vintage or degree of recency of each data storage entry. Although redundant data storage commonly involves writing to two separate memory locations, a number of memory locations greater than two may be employed and remain within the scope of the present invention.

Herein, the terms "data recency" or "data recentness" generally refer to the recency with which data was stored to a memory location, the term "vintage" generally refers to a time at which data was stored in a memory location, the term "user data" generally refers to the data being stored and retrieved from the data storage system as distinguished from information which merely describes a degree of storage recency of such user data, the terms "ranked data" or "ranked data packet" generally refer to user data which has been coupled with information describing storage recency of such user data.

In a preferred embodiment, where new data is to be written to mirrored memory locations, the inventive mechanism first reads the sequence numbers associated with the intended target memory locations for the current write operations. The resulting group of sequence numbers are then preferably compared and the most advanced sequence number (wherein the term "advanced" generally refers to more recently stored data) is preferably selected from the group. The selected sequence number is then modified to reflect a still more recent write operation, specifically, the contemplated write operation involving the "new data" referred to above. The modified selected sequence number is then preferably appended to the new data and written to all of the mirrored memory locations. If all of the mirrored memory locations are successfully written to, the sequence number at each of the mirrored memory locations may be reset, in order to set the sequence number to a more convenient value, and preferably prevent an overflow condition arising from the sequence number being incremented to a value beyond that which its allocated storage area can properly store.

It will be appreciated that a variety of operations and algorithms may be employed to modify a sequence number to indicate a degree of recency. One approach is to use unique sequence numbers for each set of mirrored memory locations and to increment the sequence number by one or another constant value for each write operation to the mirrored memory locations. Herein, the term "data storage recency value" generally represents a broader range of possible recency indicators than "sequence number." Generally, sequence numbers are but one of many possible forms of data storage recency values.

Employing this approach, the sequence number associated with a set of mirrored memory locations will keep increasing until it is reset by the inventive mechanism. Although incrementing the sequence numbers, or addition of 1 to each successive sequence number, may be employed to modify the sequence numbers, a variety of different arithmetic operations and algorithms may be employed to modify the sequence numbers for successive write operations and all such variations are included in the scope of the present invention. Such alternative operations include, but are not limited to, subtraction, multiplication, division, boolean operations, and appending alphanumeric characters to sequence numbers.

In a preferred embodiment, during a read operation, the inventive mechanism preferably reads the sequence numbers stored in each of the mirrored memory locations associated with the data being sought, and reads the data associated with the most recent of the sequence numbers read from the various memory locations. The data associated with the most recent of the sequence numbers is then preferably returned as the result of the read operation. Preferably, the inventive mechanism includes an algorithm for recognizing relative recency among the data storage recency values, of which sequence numbers are one variation, which corresponds appropriately to an algorithm used to generate the data storage recency value in the first place. For example, where the algorithm for indicating a higher degree of recency includes incrementing sequence numbers by one when overwriting an existing entry in a memory location, the algorithm for recognizing relative data storage recency among several sequence numbers preferably correlates higher numerical sequence number values with greater degrees of recency. It will be appreciated that other algorithms for recognizing data storage recency values established according to algorithms other than the sequence numbering system discussed above will similarly match the criteria for recognizing data recency with the mechanism intended to indicate data recency when the data storage recency values are first generated.

Accordingly, it is an advantage of a preferred embodiment of the present invention that the recency of data stored in two or more mirrored memory locations may be compared and the most recently stored data read from an appropriately selected one of the mirrored memory locations.

It is a further advantage of a preferred embodiment of the present invention that sequence numbers at various mirrored sites may be reset in order to begin subsequent rounds of sequence number modifications employing a more convenient number.

The foregoing has outlined rather broadly the features and technical advantages of the present invention in order that the detailed description of the invention that follows may be better understood. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 depicts logic flow for execution of a write request to mirrored memory locations according to a preferred embodiment of the present invention;

FIG. 6 depicts a ranked data storage packet according to a preferred embodiment of the present invention;

FIG. 7 depicts a sequence of steps adaptable for composing a ranked data storage packet according to a preferred embodiment of the present invention; and FIG. 8 depicts computer equipment adaptable for use with a preferred embodiment of the present invention.

DETAILED DESCRIPTION

Figure 1:
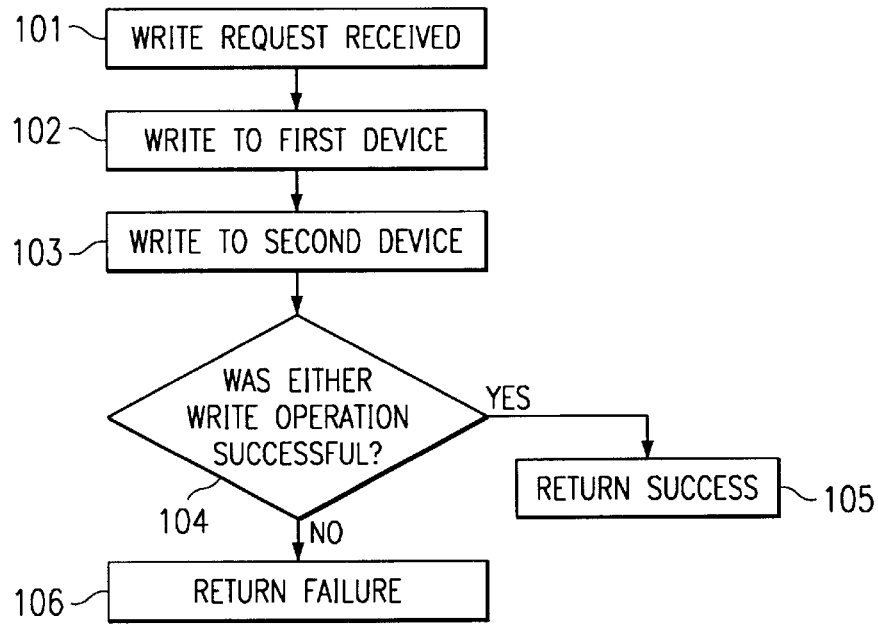
FIG. 1 depicts logic flow for execution of a write request to mirrored memory locations according to a prior art solution.

FIG. 1 depicts logic flow or program 100 for execution of a write request to mirrored memory locations according to a prior art solution. At step 101, a write request is received. At step 102, data is written to a first of two mirrored memory devices, and at step 103, the same data is generally written to a second of two mirrored memory devices. At step 104, the prior art approach determines whether either write operation was successful. If at least one of the write operations 102 and 103 was successful, the program 100 returns a success condition at step 105. If neither write operation was successful, a failure condition is generally returned in step 106.

Generally, since there is no way to guarantee that both of the mirrored devices will be available, the write operation is considered a success (step 105) if either of the write operations was successful, as illustrated by the decision diamond in step 104. Accordingly, even where a write operation is successful in the depicted prior art logic flow, it is possible that one device or memory location of a pair of mirrored devices or memory locations may have data which is more recent than the other. This condition leaves open the possibility that a read operation could retrieve obsolete data from one of the mirrored memory locations when using the system of the prior art.

FIG. 2 depicts logic flow 200 for execution of a write request to mirrored memory locations according to a preferred embodiment of the present invention. At step 201, a write request is received. Although the mirrored memory locations preferably contain the same data when employing the system and method of the present invention, where the data in the mirrored memory locations differs, the sequence of steps depicted in FIG. 2 preferably operates to select the most recently stored data in the relevant mirrored memory locations or mirrored devices. Preferably, sequence numbers stored along with the data in each of the mirrored memory locations are employed to determine which of the mirrored locations contains the most recent data.

In a preferred embodiment, at step 202, the inventive mechanism reads a sequence number from the mirrored memory location in the first device. Then, at step 203, the inventive mechanism reads the sequence number from the mirrored memory location in the second device. Where more than two mirrored memory locations are employed, the inventive mechanism preferably continues to acquire sequence numbers from a plurality of mirrored memory locations.

In a preferred embodiment, at step 204, the inventive mechanism identifies the higher sequence number of those read from the first and second devices in steps 202 and 203, respectively. At this point, the inventive mechanism preferably performs an operation on the identified highest sequence number of those read in steps 202 and 203 in order to generate a new sequence number, in step 215, to be appended to data, or user data, to be written in the instant write operation. This modification of the identified highest sequence number is preferably performed to appropriately indicate the recency of the current write operation when both the modified sequence number and the data with which it is associated are stored in one or more mirrored memory locations.

In a preferred embodiment, the new sequence number generated in step 215 may result from a range of possible operations. For example, where the recency of stored data is established by associating progressively increasing sequence numbers with stored data, the new sequence number generated in step 204 may be established by simply incrementing the identified highest sequence number read in steps 202 and 203 by a value of one. It will be realized that the sequence number could be incremented or decremented by any value and remain within the scope of the present invention. As long as the algorithm employed to recognize relative recency of retrieved sequence numbers or other data storage recency values in step 204 is consistent with the algorithm employed to generate a representation of relative data storage recency in step 215, a variety of such appropriately coupled generation and recognition schemes may be employed. Algorithms or mechanisms for indicating recency of data include incrementing or decrementing a most recently selected sequence number, performing other arithmetic operations such as, for instance, multiplication, division, or exponentiation, on the most recently selected sequence number.

In an alternative embodiment, non-numerical indicators of data storage recency may be employed. For instance, character data could be appended to stored data. The character data could be modified to indicate progressively increasing data recency, by, for instance, advancing one or more characters' positions in an alphabet with increasing data recency. For example, where a first data recency identifier is the character string "AAAA," the data stored in a subsequent store operation could be identified by the character string "AAAB." It will be appreciated that characters other than English alphabetic and numeric characters may be employed, and all such variations are included in the scope of the present invention.

In another alternative embodiment, an indication of the vintage or recency of stored data may be established by appending a clock reading or time stamp to data to be stored. Such a clock reading may be obtained from a group of devices including, but not limited to, a real time clock, a system clock, and a simple incremental counter.

In a preferred embodiment, in step 205, the new sequence number or other type of data storage recency value generated in step 215 is appended to new data to be stored in a selected group of mirrored memory locations. In step 206, the new data with data storage recency value included is preferably stored in the first mirrored memory location in the first device. In step 207, the new data with data storage recency value included is preferably stored in the second mirrored memory location in the second device.

At step 208, the inventive mechanism preferably determines whether the write operations in both step 206 and step 207 succeeded. If both write operations succeeded, the sequence numbers or data storage recency values are reset at both the first and second mirrored memory locations within the first and second devices, respectively. A success condition is then preferably returned in step 211. Resetting the sequence numbers or data storage recency values in step 209 is preferably done in order to simplify the storage of the sequence numbers and prevent an overflow condition. Since, in order to reach step 209, both write operations had to be successful, the sequence numbers or data storage recency values are preferably the same. Once the sequence numbers stored in two or more mirrored memory locations have a common value, it generally does not matter which common value is stored in the mirrored locations. This is because the sequence number values are preferably employed to compare the recency of data in the mirrored locations. Therefore, once it is established that two or more mirrored memory locations contain the same sequence number, an overflow condition may be avoided by resetting the sequence number in the two or more mirrored memory locations to a lowest possible number so as to allow subsequent incrementing of the sequence numbers to occur without incurring an overflow condition.

In a preferred embodiment, one possible reset operation, where incremented numerical values are employed for the data recency indication, is to set the sequence numbers at the mirrored memory locations to zero. Where other mechanisms are employed to indicate data recency other reset values would generally be employed, and all such variations are preferably included in the scope of the present invention.

Where less than all the write operations were successful as determined in step 209, the inventive mechanism determines, in step 212, whether either write operation succeeded. If neither write operation succeeded, a failure condition is returned in step 214.

In a preferred embodiment, where only one write operation of the write operations of steps 206 and 207 is successful, a success condition is returned in step 213. In this case, where only one of the two mirrored memory locations has been successfully written to, the new sequence number or data storage recency value generated in step 215 and appended to the data written to one of the two mirrored memory locations preferably operates to distinguish the most recently written data from the less recently written data stored in the mirrored memory location which was not successfully written to in steps 206 and 207. At step 213, the inventive mechanism may optionally set a warning flag to indicate that the write request received in step 201 was written to less than all of the mirrored memory locations.

Figure 3:
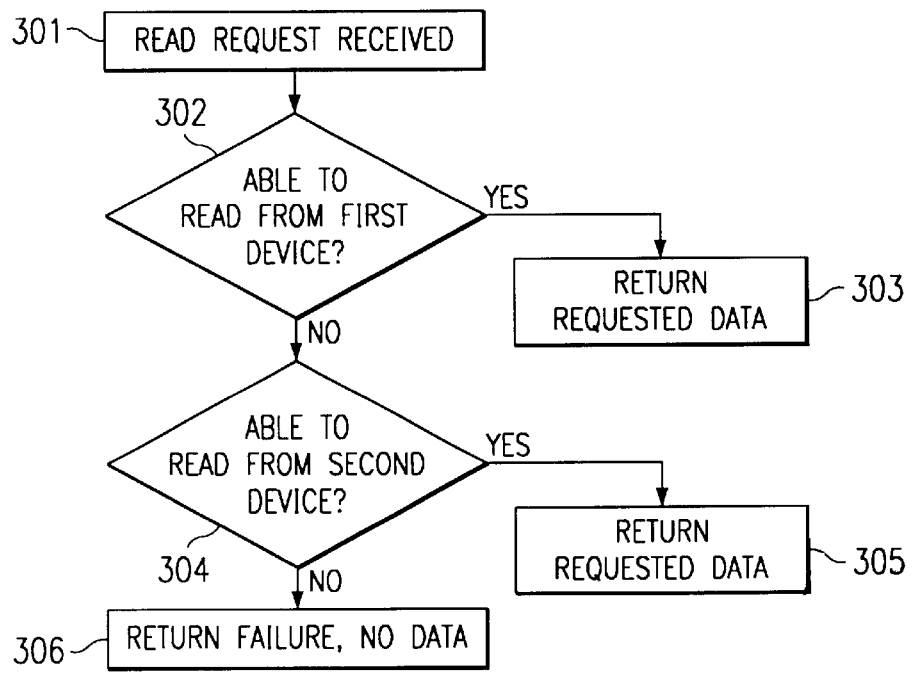
FIG. 3 depicts logic flow for execution of a read request from mirrored memory locations according to a prior art solution.

FIG. 3 depicts logic flow 300 for execution of a read request from mirrored memory locations according to a prior art solution. At step 301, a read request is received. At step 302, the system of the prior art determines whether it is able to read from a first mirrored location at a first device. If the system can read from the first device, the data is read, and a success condition is returned in step 303.

The prior art system of FIG. 3 generally does not read from the second device where it has successfully read from the first device, as illustrated by logic flow 300. This is the case because there is generally no way to determine which of the mirrored memory locations at the different devices has the most recent data. Accordingly, acquiring additional data from the second device would provide no benefit. If the data from the second device is the same as from the first device, no benefit is obtained by acquiring data from the second device. If the data acquired from the second device differs from that acquired from the first device, there is generally no mechanism for determining which data is more recent, and therefore, one set of data will have to be chosen arbitrarily. Accordingly, it may be seen that whether the data from devices 1 and 2 are the same or different, generally no benefit is obtained by reading from the second device once data has been successfully read from the first device.

Where data could not be read from the first device, the prior art system generally determines, in step 304, whether data may be read from the second device. If data can be read from the second device, a success condition is generally returned in step 305. Where data cannot be read from the second device in step 304, thereby indicating that the prior art system could not read from either device, a failure condition is generally returned in step 306.

Figure 4:
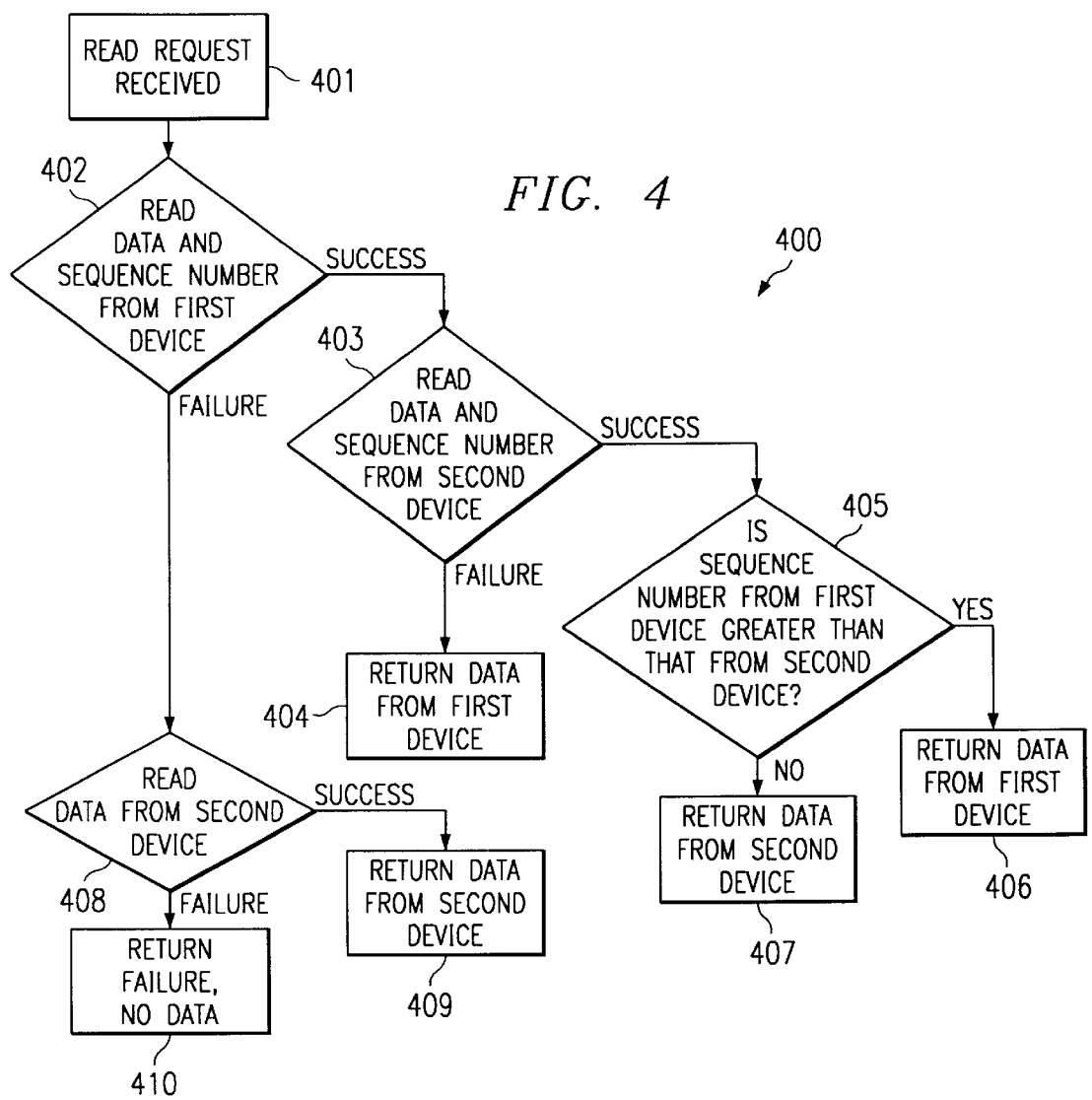
FIG. 4 depicts logic flow for execution of a read request from mirrored memory locations according to a preferred embodiment of the present invention.

FIG. 4 depicts logic flow 400 for execution of a read request from mirrored memory locations according to a preferred embodiment of the present invention. At step 401, a read request is preferably received.

In a preferred embodiment, at step 402, the inventive mechanism issues a request to read data and an associated sequence number or data storage recency value from a first device. If the read operation of step 402 is successful, the inventive mechanism proceeds to issue a request to read data and an associated sequence number from a mirrored memory location in a second device in step 403. Where the read operation from the second device in step 403 is successful, the inventive mechanism preferably determines whether the first device or second device had the most recent data.

In a preferred embodiment, this determination of recency may be accomplished by determining which of the sequence numbers is greater. Where data storage recency values are generated by algorithms other than progressively increasing sequence numbers, comparisons of the recency of storage of the data read from the first device and the second device may be compared employing comparison algorithms appropriately suited to the algorithms employed to generate the data storage recency values, and all such variations are included within the scope of the present invention.

At step 404, where data cannot be read from the second device in step 403, data read from the first device is preferably returned as the result of the read request received in step 401. In this situation, a flag may optionally be set to indicate that data was returned based on the contents of the first device without having verified that its data was stored more recently than that of the second device.

In step 405, if the data read from the first device is more recent (meaning stored more recently) than the data read from the second device, then in step 406, the data read from the first device is returned as the result of the read request received in step 401. If the data read from the second device is the most recent, as determined in step 405, then in step 407, the data read from the second device is returned as the result of the read request received in step 401.

In a preferred embodiment, where data cannot be read from the first device in step 402, the inventive mechanism operates to read data from the second device in step 408. At this stage of logic flow, or flowchart, 400, there will generally not be a comparison between the sequence numbers associated with data read from two or more different devices, and accordingly, the sequence number associated with the data stored in the second device is generally not read in step 408. However, in an alternative embodiment, the sequence number could optionally be read in step 408. Then, in step 409, where data was successfully read from the second device, the data acquired from the second device is returned as the result of the read request received in step 401.

In a preferred embodiment, where the read operation in step 408 is unsuccessful, a failure condition is returned as the result of the read request in step 401. Generally, where execution reaches step 410, no data is provided as a result of the read request of step 401.

It will be appreciated that the inventive system and method may be applied to any number of mirrored memory devices. The discussion of operation of the inventive mechanism having two memory devices in the preceding section is merely illustrative of a preferred embodiment. The invention is not limited to the use of only two mirrored storage devices.

Figure 5:
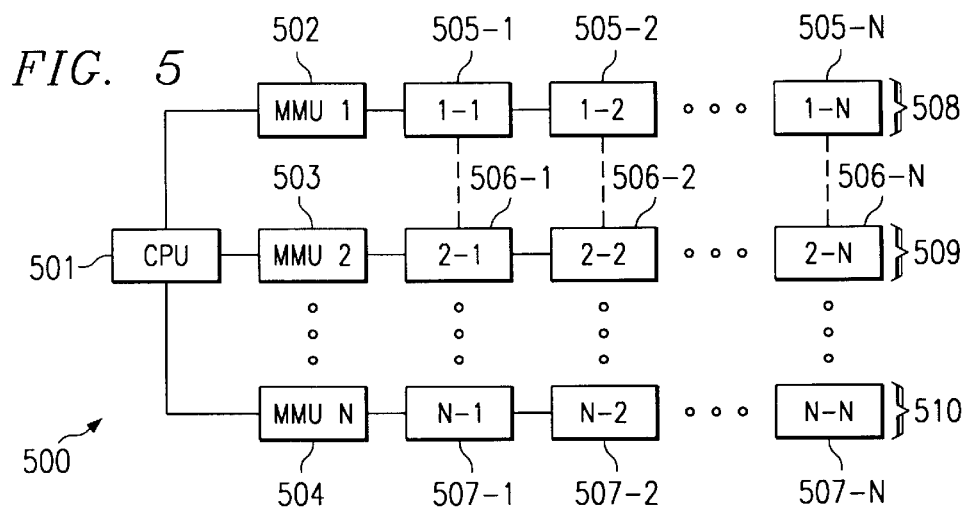
FIG. 5 depicts an exemplary set of memory management units and associated mirrored memory locations adaptable for use with a preferred embodiment of the present invention.

FIG. 5 depicts a system 500 including a plurality of devices having mirrored memory locations adaptable for use with a preferred embodiment of the present invention. FIG. 5 depicts central processing unit (CPU) 501, and a plurality of devices: device 1 508, device 2 509, and device N 510. FIG. 5 generally indicates that an essentially unlimited number of devices may be disposed between device 2 509 and device N 510. Generally, each device includes a memory management unit and a plurality of memory locations. The apparatus depicted in FIG. 5 is for illustrative purposes only. It will be appreciated that a range of devices could be employed for data storage purposes, and all such variations are included within the scope of the present invention.

In a preferred embodiment, the various devices include memory locations which are mirrored with memory locations within other devices. Dashed lines are employed to indicate associations between mirrored memory locations between device 1 508 and device 2 509. Specifically, memory location 1-1 505 and memory location 2-1 are shown as mirrored. A similar relationship is shown between locations 1-2 505-2 and 2-2 506-2, and between memory locations 1-N 505-N and 2-N 506-N. In general, mirroring of memory locations is employed to provide redundant memory storage in the event that data stored within one of the mirrored memory locations is destroyed. It will be appreciated that the inventive system and method may be applied employing any number of mirrored memory devices. The discussion of two memory devices in connection with certain preceding FIGURES is merely illustrative of a preferred embodiment. The invention is not limited to the use of only two mirrored storage devices.

It may be seen from FIG. 5 that more than two devices may be incorporated into the memory location mirroring scheme of the present invention. Although FIGS. 2 and 4 address the use of sequence numbers in connection with two mirrored devices, the concept of comparing sequence numbers or data storage recency values (whether numeric, alphabetic, alphanumeric or other form) to determine which of a plurality of mirrored memory locations may be readily extended from two mirrored memory locations to any number of mirrored memory locations. Where more than two mirrored memory locations are employed, instead of directing the inventive mechanism to determine the higher of two sequence numbers (or most recent of two recency indicators), the inventive mechanism may be directed to determine the highest of three or more sequence numbers (or most recent of three or more recency indicators). Upon having identified a mirrored memory location with the desired data from whatever number of mirrored memory locations are employed, the inventive mechanism may then proceed to return the data stored in the mirrored memory location found to contain the most recent data.

In like manner, for a write operation, instead of writing new data and a newly generated sequence number or other data storage recency value to two mirrored memory locations, the inventive mechanism may write the new data and data storage recency value to three or more mirrored memory locations.

FIG. 6 depicts a ranked data storage packet 600 according to a preferred embodiment of the present invention. Data packet 600 preferably includes data for storage or user data 601 and data storage recency value 602. Data storage packet 600 is formed by appending data storage recency value 602 to user data 601. The data storage recency value or data recency value is preferably determined based upon data recency values in existence in a storage system prior to the creation of data recency value 602 and an algorithm for modifying a most recent identified data recency value present among the plurality of mirrored memory locations to which ranked data packet 602 will be written. After data storage recency value data is appended to user data 601, the resulting data packet 600 is "ranked" in the sense that the data recency information provides a recency ranking of data packet 600 with respect to other data packets stored in an overall data storage system, such as the data storage system 500 discussed in connection with FIG. 5.

FIG. 7 depicts a sequence of steps adaptable for composing a ranked data storage packet according to a preferred embodiment of the present invention. The sequence of steps depicted in FIG. 7 generally expands upon a subset of the steps depicted in FIG. 2, and presents a more general approach than the determination of a new sequence number based upon reading sequence numbers from two mirrored memory locations, as depicted in FIG. 2.

In a preferred embodiment, at step 701, data or user data is prepared for a current write operation. At step 702, the inventive mechanism reads data storage recency values from target mirrored memory locations. The target memory locations generally refer to those memory locations to which the inventive mechanism expects to write a completed ranked data packet as depicted by reference numeral 600 depicted in FIG. 6. Steps 702–704 are preferably performed in order to ensure that the recency value appended to user data in the current write operation indicates a higher degree of recency than any currently existing data entry among the various mirrored memory locations. In the event that not all the mirrored locations are successfully written to in the current write operation, the recency value associated with the current write operation preferably operates to indicate a greater degree of recency for data stored by the current write operation than data stored in previous write operations. During a subsequent "read" operation, these indications of relative data storage recency preferably operate to enable the inventive mechanism to only read data associated with the most recent storage operation as indicated by the data recency values.

In a preferred embodiment, at step 703, the inventive mechanism identifies the most recent of the data recency values read in step 702. The algorithm for identifying the most recent of the data recency values will generally depend upon the algorithm employed to establish the data storage recency values. Several such algorithms have been discussed herein. Such algorithms may include, but are not limited to, adding constant values to prior recency values, performing other arithmetic operations on prior recency values, and performing manipulations of alphabetic values, and all such variations are included within the scope of the present invention.

In a preferred embodiment, at step 704, the data storage recency value identified in step 703 as being the most recent of the data storage recency values read in step 702 is preferably modified to reflect the recency of the current write operation. In a simple case where the data recency values are sequence numbers which are incremented by a value of 1 for progressively more recent storage operations, the modification would preferably include adding 1 to the identified most recent data storage recency value.

In an alternative embodiment, a sequence number could be incremented by a value other than 1. A sequence number could also be decremented to reflect a more recent storage operation. Still other approaches could involve performing other arithmetic operations on numeric values or manipulations of alphabetic characters consistent with the recency indication algorithm currently in use. Whatever approach is used, the outcome of step 704 preferably produces a data recency value which reflects the recency of the current write operation.

In a preferred embodiment, the data recency value generated in step 704 is preferably appended to the user data 601 or data to be stored, thereby creating a ranked data storage packet 600 (FIG. 6). The ranked data storage packet is then preferably stored at a plurality of mirrored memory locations within an overall storage device.

FIG. 8 illustrates computer system 800 adaptable for use with a preferred embodiment of the present invention. Central processing unit (CPU) 801 is coupled to system bus 802. The CPU 801 may be any general purpose CPU, such as an HP PA-8200. However, the present invention is not restricted by the architecture of CPU 801 as long as CPU 801 supports the inventive operations as described herein. Bus 802 is coupled to random access memory (RAM) 803, which may be SRAM, DRAM, or SDRAM. ROM 804 is also coupled to bus 802, which may be PROM, EPROM, or EEPROM. RAM 803 and ROM 804 hold user and system data and programs as is well known in the art.

Bus 802 is also coupled to input/output (I/O) adapter 805, communications adapter card 811, user interface adapter 808, and display adapter 809. I/O adapter 805 connects to storage devices 806, such as one or more of hard drive, CD drive, floppy disk drive, tape drive, to the computer system. Communications adapter 811 is adapted to couple the computer system 800 to a network 812, which may be one or more of local (LAN), wide-area (WAN), Ethernet or Internet network. User interface adapter 808 couples user input devices, such as keyboard 813 and pointing device 807, to the computer system 800. Display adapter 809 is driven by CPU 801 to control the display on display device 810.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for executing a write request to mirrored memory locations comprising the steps of:
    acquiring data for a current data write operation to a data storage system;
    generating a data storage recency value for said current write operation;
    appending said data storage recency value to said acquired data, thereby generating ranked data; and
    writing said ranked data to a plurality of mirrored memory locations in said storage system.

2. The method of claim 1 wherein the step of generating a data storage recency value comprises the steps of:
    identifying a highest indication of recency among data recency values existing at said plurality of mirrored memory locations;
    modifying said identified highest indication of recency to reflect a higher degree of recency; and establishing said modified identified highest indication of recency as said data storage recency indication for said current write operation.

3. The method of claim 1 wherein the step of generating a data storage recency value comprises the steps of:
identifying a highest sequence number among sequence numbers indicating data storage recency at said plurality of mirrored memory locations;
incrementing said identified highest sequence number; and
establishing said incremented identified highest sequence number as said data storage recency value for said current write operation.

4. The method of claim 1 further comprising the step of:
where said step of writing said ranked data to said plurality of mirrored memory locations succeeds at all of said mirrored memory locations, resetting data storage recency values at all of said plurality of mirrored memory locations.

5. The method of claim 1 further comprising the step of:
reading, from said plurality of mirrored memory locations, data from a memory location most recently written to among said plurality of mirrored memory locations.

6. The method of claim 5 wherein said reading step comprises the steps of:
acquiring stored data and data storage recency values from said plurality of mirrored memory locations; and
identifying a data storage recency value having a highest indication of recency among said acquired data storage recency values;
returning stored data associated with said identified data storage recency value having said highest indication of recency as a result of said step of reading.

7. The method of claim 1 wherein said plurality of mirrored memory locations comprises only two mirrored memory locations, and said data storage recency values are sequence numbers whose value is incremented with progressively increasing data recency, thereby establishing two sequence numbers.

8. The method of claim 7 comprising the further step of:
requesting stored data and said two sequence numbers values from said two mirrored memory locations.

9. The method of claim 8 comprising the further steps of:
where both of said two mirrored memory locations are accessible, acquiring said stored data and said two sequence numbers from said two mirrored memory locations;
determining a higher sequence number of said two sequence numbers; and
returning stored data associated with said higher sequence number as a result of a read operation.

10. The method of claim 8 comprising the further steps of:
where only one of said two mirrored memory locations is accessible,
acquiring stored data and a sequence number stored at said one accessible mirrored memory location.

11. The method of claim 10 comprising the further step of:
setting a flag indicating an inaccessibility of one of said two mirrored memory locations.

12. A data storage system including information indicating a validity of stored data, the system comprising:
a plurality of mirrored memory locations;
user data stored at a first memory location of said plurality of mirrored memory locations; and
a data storage recency value appended to said stored user data at said first memory location to form a ranked data storage packet.

13. The data storage system of claim 12 further comprising:
user data stored at at least one additional memory location of said plurality of mirrored memory locations; and
data storage recency values appended to each of said at least one additional memory location of said plurality of mirrored memory locations, thereby forming ranked data storage packets at said at least one additional memory location, thereby providing at least two mirrored memory locations each having appended data storage recency values and ranked data storage packets.

14. The data storage system of claim 13 further comprising:
a memory read instruction able to compare data storage recency values at each of said at least two mirrored memory locations.

15. The data storage system of claim 14 further comprising:
an algorithm for recognizing, based on said appended data storage recency values, a memory location of said at least two mirrored memory locations whose user data was most recently stored.

16. The data storage system of claim 12 wherein said data recency value is a sequence number.

17. The data storage system of claim 12 wherein said data recency value is a time stamp.

18. A computer program product having a computer readable medium having computer program logic recorded thereon for providing an indication of validity of currently stored data in a data storage system, the computer program product comprising:
code for acquiring user data for a current write operation to said data storage system;
code for appending a data storage recency value to said acquired user data for said current write operation to produce a ranked data packet;
code for writing said ranked data packet to a plurality of mirrored memory locations in said storage system.

19. The computer program product of claim 18 wherein the code for appending a data storage recency value comprises:
code for identifying a highest indication of recency among data recency values existing at said plurality of mirrored memory locations;
code for modifying said identified highest indication of recency to reflect a higher degree of recency; and
code for establishing said modified identified highest indication of recency as said data storage recency indication for said current write operation.

20. The computer program product of claim 18 wherein the code for appending a data storage recency indication comprises:
code for identifying a highest sequence number among sequence numbers indicating data storage recency at said plurality of mirrored memory locations;
code for incrementing said identified highest sequence number; and
code for establishing said incremented identified highest sequence number as said data storage recency indication for said current write operation.

* * * * *

UNITED STATES PATENT AND TRADEMARK OFFICE
CERTIFICATE OF CORRECTION

PATENT NO.   : 6,629,108 B2
DATED        : September 30, 2003
INVENTOR(S)  : Amy L. Frey et al.

It is certified that error appears in the above-identified patent and that said Letters Patent is hereby corrected as shown below:

Title page,
Item [54], Title, delete "METHOD FOR INSURING DATA INTEGRITY FOR MIRRORED INDEPENDENTLY ACCESSIBLE MEMORY DEVICES" and insert therefor -- METHOD FOR INSURING DATA INTEGRITY OF MIRRORED INDEPENDENTLY ACCESSIBLE MEMORY DEVICES --

Signed and Sealed this

Fifteenth Day of March, 2005

JON W. DUDAS
*Director of the United States Patent and Trademark Office*